(12) United States Patent
Guillez et al.

(10) Patent No.: US 6,682,125 B2
(45) Date of Patent: Jan. 27, 2004

(54) RETRACTABLE HARD TOP SYSTEM FOR CONVERTIBLE CAR

(75) Inventors: Jean-Marc Guillez, Cerizay (FR); Paul Queveau, Cerizay (FR); Gerard Queveau, Cerizay (FR)

(73) Assignee: Societe Europeene de Brevets Automobiles (FR)

( * ) Notice: Subject to any disclaimer, the term of this patent is extended or adjusted under 35 U.S.C. 154(b) by 0 days.

(21) Appl. No.: 10/221,641

(22) PCT Filed: Apr. 20, 2001

(86) PCT No.: PCT/FR01/01231

§ 371 (c)(1),
(2), (4) Date: Dec. 10, 2002

(87) PCT Pub. No.: WO01/85480

PCT Pub. Date: Nov. 15, 2000

(65) Prior Publication Data

US 2003/0184116 A1 Oct. 2, 2003

(51) Int. Cl.$^7$ .................................................. B60J 7/02
(52) U.S. Cl. .............................. 296/107.18; 296/107.17
(58) Field of Search ...................... 296/107.18, 107.17, 296/107.2, 107.16, 107.19

(56) References Cited

FOREIGN PATENT DOCUMENTS

| DE | 43 26 255 | * | 9/1994 |
| DE | 198 03 883 | * | 8/1999 |
| EP | 0 554 694 | * | 8/1993 |
| FR | 2 694 245 | * | 2/1994 |
| FR | 2 801 538 | * | 6/2001 |

* cited by examiner

Primary Examiner—Joseph D. Pape
(74) Attorney, Agent, or Firm—Bachman & LaPointe, P.C.

(57) ABSTRACT

The system comprises at least a first front roof element hinged relative to the rear roof element and a controller for pivoting of the first front roof element relative to the rear roof element. A guide arrangement for guiding the rear roof element and the controller for controlling the first front roof element are arranged in such a manner as to guide the first front roof element along a predetermined path to a retracted position in which the first front roof element is stowed in a substantially vertical position behind the back seat of the vehicle.

10 Claims, 5 Drawing Sheets

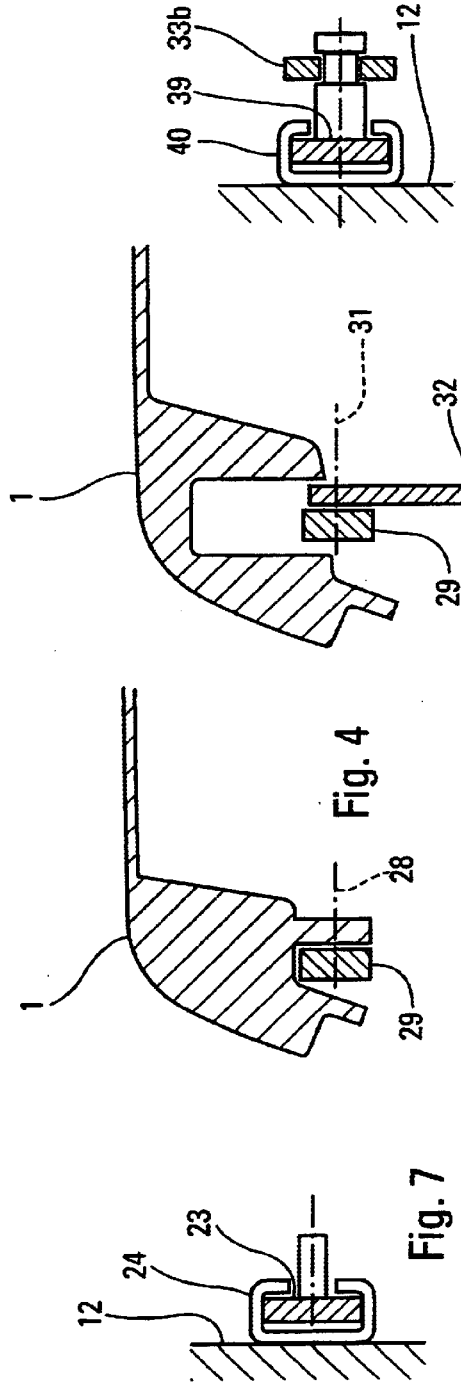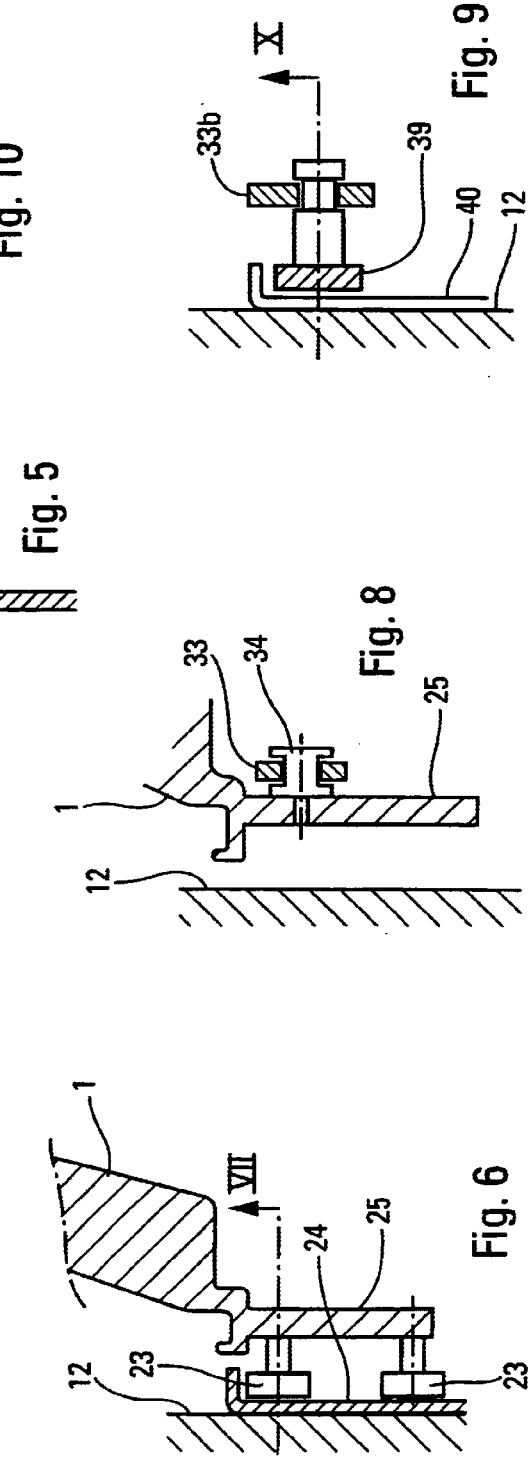

RETRACTABLE HARD TOP SYSTEM FOR CONVERTIBLE CAR

BACKGROUND OF THE INVENTION

The present invention relates to a retractable hard top system for a convertible vehicle.

A retractable hard top system for a convertible vehicle is disclosed in particular by French patent application 99/15106 which discloses a system comprising a rear roof element mounted on the structure of the vehicle via guide means arranged in such a manner that the rear roof element is capable of being retracted into the rear trunk of said vehicle in generally pivoting movement starting from its closed position, said pivoting being rearwards during a first stage and then forwards during a second stage into the retracted position in which said rear roof element is stowed in a substantially horizontal position with its concave side facing downwards.

The first step of pivoting rearwards serves in particular to move the rear roof element out of the way to release the corresponding opening in order to allow the other roof elements to be retracted into the rear trunk of the vehicle.

In the example described, the rear roof element pivots about two pivots situated on a common pivot axis and on respective side walls of the vehicle.

As shown diagrammatically in FIG. 1, a rear roof element 1 pivoting about its pivot axis 2 is of length L1 as measured in the plane of the figure, which length corresponds to the radius of the circumference 3 described by the top edge 4 of the front edge face 5 of said rear roof element 1.

To be able to house the rear roof element 1 in the rear trunk 6, it is necessary for the space available between the pivot axis 2 and the rear face 7 of the back seat 8, as represented by L2, to be greater than the length L1.

It is also necessary to take account of the length L3 which represents the length available for passengers inside the cabin 9 of the vehicle 10 and which needs to be covered by other roof elements which must also be housed in the space L2.

SUMMARY OF THE INVENTION

The object of the present invention is to remedy the drawbacks of known systems and to propose a retractable hard top system of the above-specified type giving the designer of the vehicle very great freedom of action to adapt a retractable hard top system to a vehicle of any given type.

According to the invention, the retractable hard top system of the above-specified type is characterized in that it further comprises at least a first front roof element hinged relative to said rear roof element and control means for controlling pivoting of said first front roof element relative to the rear roof element, and in that said means for guiding the rear roof element and said means for controlling the first front roof element are arranged in such a manner as to guide said first front roof element along a predetermined path to a retracted position in which the first front roof element is stowed in a substantially vertical position behind the back seat of the vehicle.

This makes it possible to select the respective dimensions of the rear roof element and of the first front roof element as a function of the dimensions of the rear trunk of the vehicle in the vertical and longitudinal directions.

Such a system can also be installed on a vehicle of relatively great length, since the system enables the first front roof element to be stowed in a position that is relatively convenient, thereby simplifying the problem of also stowing any other front roof elements in the rear trunk.

Other characteristics and advantages of the present invention appear in the following detailed description.

BRIEF DESCRIPTION OF THE DRAWINGS

In the accompanying drawings, given purely as non-limiting examples:

FIG. 4 is a larger-scale fragmentary view in section on IV—IV of FIG. 3;

FIG. 5 is a larger-scale fragmentary view in section on V—V of FIG. 3;

FIG. 6 is a larger-scale fragmentary view in section on VI—VI of FIG. 3;

FIG. 7 is a fragmentary view in section on VII—VII of FIG. 6;

FIG. 8 is a larger-scale fragmentary view in section on VIII—VIII of FIG. 3;

FIG. 9 is a larger-scale fragmentary view in section on IX—IX of FIG. 3;

FIG. 10 is a fragmentary view in section on X—X of FIG. 9;

DETAILED DESCRIPTION OF THE PREFERRED EMBODIMENT(S)

Figure 1:
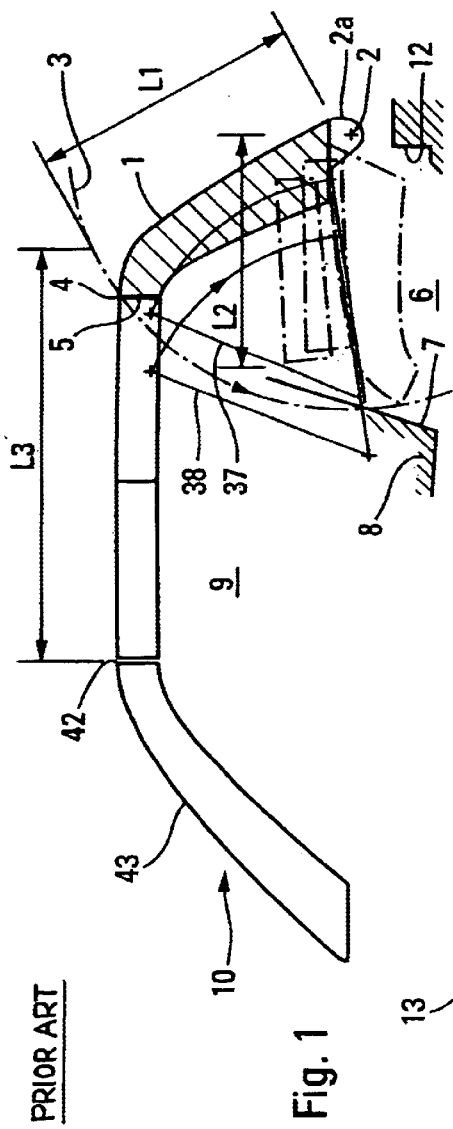
FIG. 1 is a diagrammatic longitudinal section view of a vehicle having a prior art retractable hard top system.
Figure 2:
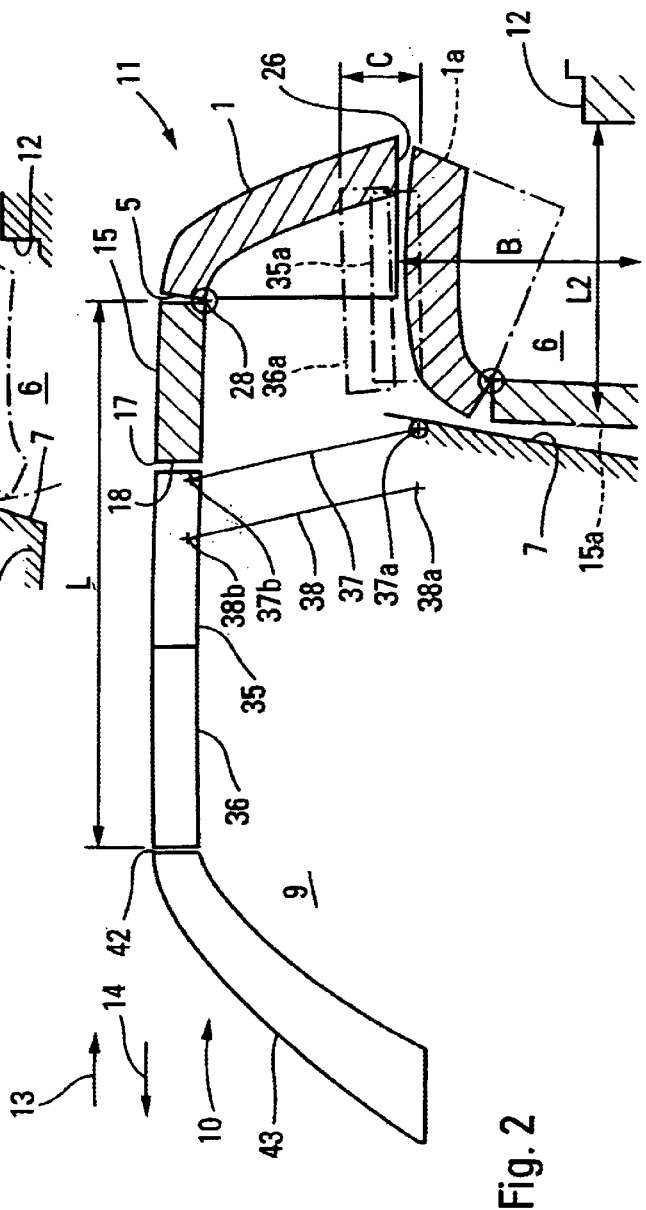
FIG. 2 is a view similar to FIG. 1 showing an embodiment of the present invention.
Figure 3:
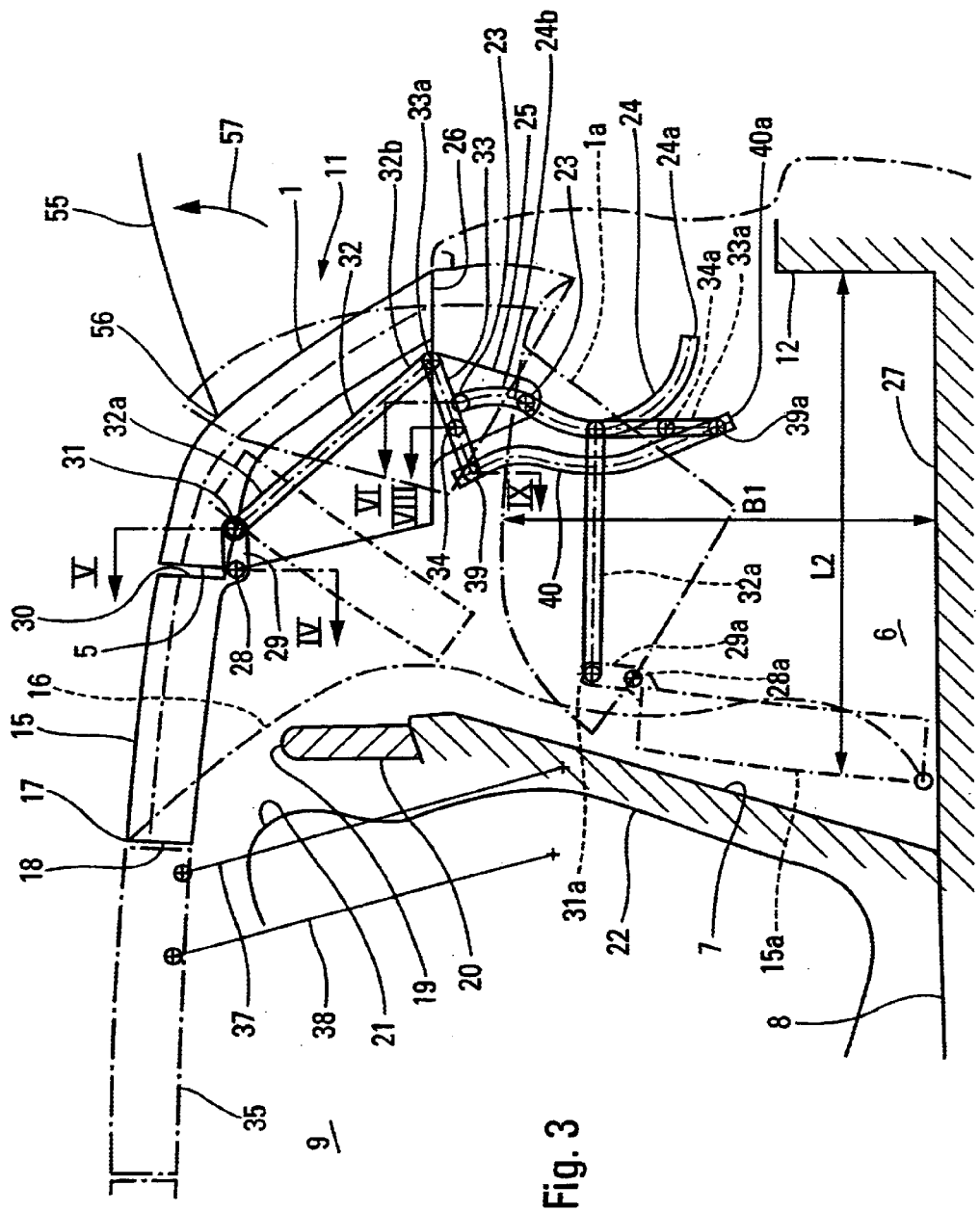
FIG. 3 is a larger-scale view showing a detail of FIG. 2.
Figure 11:
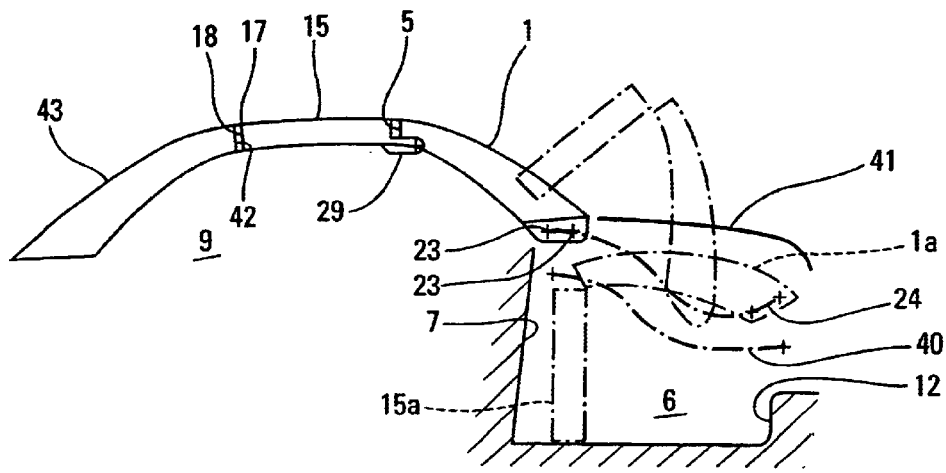
FIG. 11 is a diagrammatic view similar to FIG. 3 showing another embodiment of the present invention.
Figure 12:
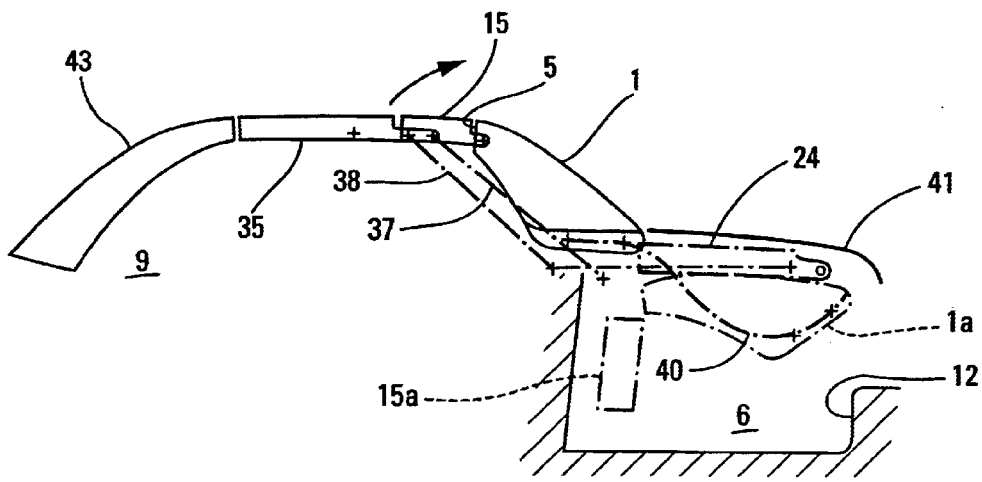
FIG. 12 is a view similar to FIG. 3 showing another embodiment of the present invention.
Figure 15:
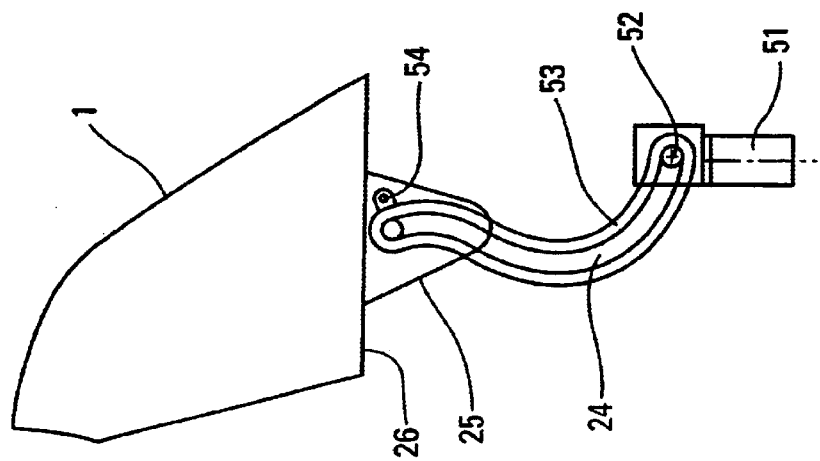
FIGS. 13, 14, and 15 are larger-scale views showing a detail of FIG. 3 and constituting by way of example three different embodiments of means for driving the rear roof element of the system of the present invention.
Figure 14:
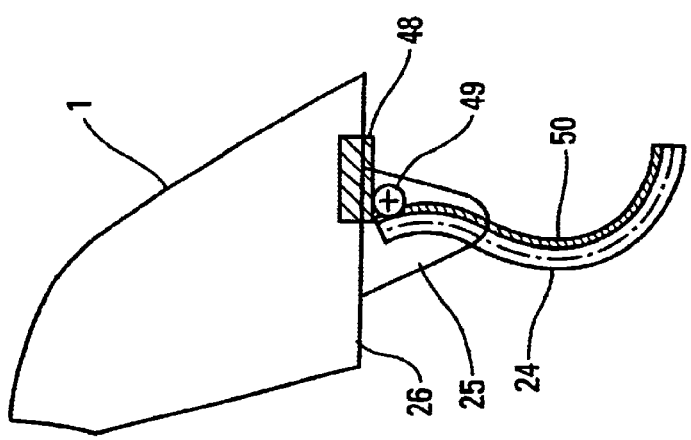
Figure 13:
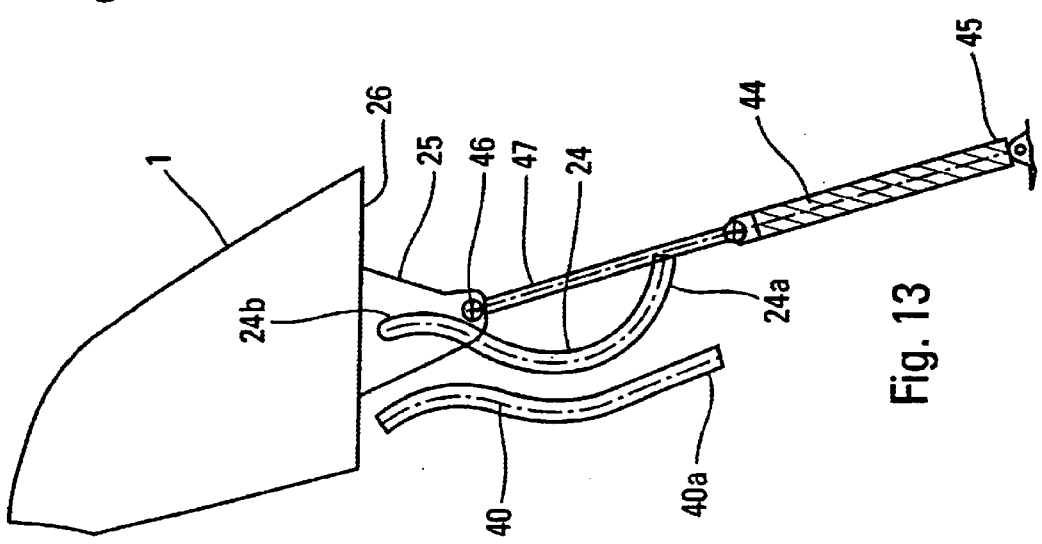

The description below uses the reference numerals already used above when describing the prior art shown diagrammatically in FIG. 1.

In the embodiment shown in FIGS. 2 to 10, the retractable hard top system 11 for a convertible vehicle

What is claimed is:

1. A retractable hard top roof system for a convertible vehicle, the system comprising a rear roof element mounted on a structure of the vehicle via guide means arranged in such a manner that the rear roof element is capable of being retracted into a rear trunk of said vehicle in generally pivoting movement starting from a closed position, said pivoting movement being rearwards during a first stage and then forwards during a second stage into a retracted position in which said rear roof element is stowed in a substantially horizontal position with its concave side facing downwards, at least a first front roof element hinged relative to said rear roof element and control means for controlling pivoting of said first front roof element relative to the rear roof element, said guide means and said means for controlling the first front roof element being arranged in such a manner as to guide said first front roof element along a predetermined path to a retracted position in which the first front roof element is stowed in a substantially vertical position behind a back seat of the vehicle.

2. A roof system according to claim 1, wherein the rear roof element carries a respective pair of wheels on each side of the vehicle, the two wheels in each pair being mounted to slide in a common slideway having its concave side starting from its end corresponding to the closed position of the rear roof element facing towards the inside of the vehicle for rearward pivoting of said rear roof element, and having its concave side starting from its end corresponding to the retracted position of the rear roof element facing towards the outside of the vehicle for forward pivoting of said rear roof element.

3. A roof system according to claim 2, wherein the two wheels of each pair are carried by a respective projection extending downwards from a bottom edge face of the rear roof element.

4. A roof system according to claim 1, wherein the first front roof element is hinged on either side of the vehicle about a first hinge axis situated close to a front edge face of the rear roof element and carried by a finger projecting towards the rear of the vehicle relative to a rear edge face of said front roof element.

5. A roof system according to claim 4, wherein each said finger extends beyond said first hinge axis to a rear end carrying a second hinge axis for hinging a respective finger to a top end of a respective control lever.

6. A roof system according to claim 5, wherein a bottom end of each control lever is hinged to a first end of a pivot arm pivotally mounted in a middle portion about a pivot carried by the rear roof element.

7. A roof system according to claim 6, wherein a second end of each said pivot arm carries a wheel sliding in a second slideway carried by the structure of the vehicle.

8. A roof system according to claim 1, further comprising at least a second front roof element situated in the closed position of the roof system in front of the first front roof element, and means for displacing said second front roof element from a closed position to a retracted open position in the rear trunk of the vehicle.

9. A roof system according to claim 1, wherein the vehicle is of a two compartment type, and has two slideways extending generally in a substantially vertical direction.

10. A roof system according to claim 1, wherein the vehicle is of a three compartment type, and the roof system has two slideways extending generally in a direction that makes an angle with a horizontal direction.

* * * * *